(12) United States Patent
Walsh et al.

(10) Patent No.: US 9,058,090 B1
(45) Date of Patent: Jun. 16, 2015

(54) COLLABORATIVE INFORMATION SHARING IN A VIRTUAL WORLD

(75) Inventors: Richard J. Walsh, Raleigh, NC (US); Kunal Kandekar, Raleigh, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1437 days.

(21) Appl. No.: 12/131,353

(22) Filed: Jun. 2, 2008

(51) Int. Cl.
  *G06F 3/00* (2006.01)
  *G06F 3/0481* (2013.01)
  *A63F 13/30* (2014.01)

(52) U.S. Cl.
  CPC ............ *G06F 3/04815* (2013.01); *A63F 13/30* (2014.09)

(58) Field of Classification Search
  CPC ... G06Q 10/103; G06F 3/0481; G06F 3/0483; G06F 3/04815
  USPC .......................... 715/711, 850, 852, 751, 757
  See application file for complete search history.

(56) References Cited

U.S. PATENT DOCUMENTS

| | | |
|---|---|---|
| 6,604,134 B2 | 8/2003 | Haury |
| 6,804,662 B1 | 10/2004 | Annau et al. |
| 7,039,634 B2 | 5/2006 | Xu et al. |
| 7,089,278 B1 | 8/2006 | Churchill et al. |
| 7,089,301 B1 | 8/2006 | Labio et al. |
| 7,181,690 B1 | 2/2007 | Leahy et al. |
| 7,245,620 B2 | 7/2007 | Shankar |
| 7,269,632 B2 | 9/2007 | Edeker et al. |
| 7,437,733 B2 | 10/2008 | Manzano |
| 7,493,558 B2 * | 2/2009 | Leahy et al. ................... 715/704 |
| 7,512,071 B2 | 3/2009 | Goldschmidt et al. |
| 7,647,306 B2 * | 1/2010 | Rose et al. ............. 707/999.003 |
| 7,685,224 B2 | 3/2010 | Nye |
| 7,688,761 B2 | 3/2010 | Paramaguru |
| 7,792,801 B2 * | 9/2010 | Hamilton et al. .............. 707/655 |
| 7,814,153 B2 * | 10/2010 | Flesch et al. ................... 709/205 |
| 7,814,154 B1 | 10/2010 | Kandekar et al. |
| 7,831,707 B2 | 11/2010 | Bardsley |
| 8,005,850 B2 * | 8/2011 | Walther et al. ................. 707/758 |

(Continued)

FOREIGN PATENT DOCUMENTS

| | | |
|---|---|---|
| EP | 0 614 139 A2 | 9/1994 |
| EP | 1 494 432 A2 | 1/2005 |

(Continued)

OTHER PUBLICATIONS

Kadobayashi et al, "Annotation Authoring in Collaborative 3D Virtual Environments", Dec. 2005, ICAT, pp. 1-3.*

(Continued)

*Primary Examiner* — Ryan Pitaro
(74) *Attorney, Agent, or Firm* — Withrow & Terranova, PLLC (57) ABSTRACT

A system and method are provided for enabling information sharing in a distributed virtual world. In general, a virtual world client associated with a user participating in a virtual world operates to obtain one or more annotations associated with virtual world constructs identified as being of interest to the user. The virtual world constructs of interest to the user may be identified by the user or identified automatically by the virtual world client. In one embodiment, the one or more annotations are defined by other users participating in the virtual world. Once the one or more annotations are obtained, the virtual world client may, for example, present the one or more annotations to the user, present a portion of the one or more annotations to the user, notify the user that the one or more annotations are available, or the like.

13 Claims, 10 Drawing Sheets

(56) References Cited

U.S. PATENT DOCUMENTS

| | | | |
|---|---|---|---|
| 8,127,297 B2* | 2/2012 | Hamilton et al. | 718/104 |
| 2001/0018658 A1* | 8/2001 | Kim | 705/1 |
| 2002/0066022 A1 | 5/2002 | Calder et al. | |
| 2002/0073075 A1 | 6/2002 | Dutta et al. | |
| 2002/0095399 A1 | 7/2002 | Devine et al. | |
| 2002/0147771 A1 | 10/2002 | Traversat et al. | |
| 2003/0008712 A1 | 1/2003 | Poulin | |
| 2003/0014423 A1* | 1/2003 | Chuah et al. | 707/102 |
| 2003/0088544 A1 | 5/2003 | Kan et al. | |
| 2003/0131006 A1 | 7/2003 | Monahan et al. | |
| 2003/0177187 A1 | 9/2003 | Levine et al. | |
| 2004/0078800 A1 | 4/2004 | Manzano | |
| 2004/0201626 A1 | 10/2004 | Lavoie et al. | |
| 2004/0260701 A1 | 12/2004 | Lehikoinen et al. | |
| 2005/0076207 A1 | 4/2005 | Park et al. | |
| 2005/0120073 A1 | 6/2005 | Cho | |
| 2005/0203922 A1 | 9/2005 | Uhlir et al. | |
| 2005/0280661 A1* | 12/2005 | Kobayashi et al. | 345/633 |
| 2006/0085385 A1 | 4/2006 | Foster et al. | |
| 2006/0190427 A1 | 8/2006 | Peters et al. | |
| 2006/0218274 A1 | 9/2006 | Labio et al. | |
| 2007/0136389 A1 | 6/2007 | Bergant et al. | |
| 2007/0238520 A1* | 10/2007 | Kacmarcik | 463/33 |
| 2007/0271301 A1 | 11/2007 | Klive | |
| 2007/0288404 A1* | 12/2007 | Kacmarcik | 706/11 |
| 2007/0288598 A1 | 12/2007 | Edeker et al. | |
| 2007/0294257 A1* | 12/2007 | Frieder et al. | 707/10 |
| 2008/0090659 A1 | 4/2008 | Aguilar et al. | |
| 2008/0201321 A1 | 8/2008 | Fitzpatrick et al. | |
| 2008/0207327 A1 | 8/2008 | Van Luchene et al. | |
| 2009/0099824 A1 | 4/2009 | Falash et al. | |
| 2009/0100109 A1* | 4/2009 | Turski et al. | 707/200 |
| 2009/0125481 A1* | 5/2009 | Mendes da Costa et al. | 707/3 |
| 2009/0154893 A1* | 6/2009 | Vasudevan et al. | 386/66 |
| 2009/0271369 A1* | 10/2009 | Cheng et al. | 707/3 |
| 2010/0100851 A1* | 4/2010 | Clark et al. | 715/849 |
| 2010/0122182 A1* | 5/2010 | Bromenshenkel et al. | 715/745 |
| 2010/0141648 A1* | 6/2010 | Bell et al. | 345/419 |
| 2010/0306825 A1* | 12/2010 | Spivack | 726/4 |
| 2011/0213805 A1* | 9/2011 | Walther et al. | 707/780 |

FOREIGN PATENT DOCUMENTS

| | | |
|---|---|---|
| EP | 1 536 612 A1 | 6/2005 |
| WO | WO 93/25962 A1 | 12/1993 |
| WO | WO 02/15035 A2 | 2/2002 |
| WO | WO 03/081447 A1 | 10/2003 |

OTHER PUBLICATIONS

B. Haberman, "Allocation Guidelines for IPv6 Multicast Addresses," (article), Aug. 2002, 8 pages, The Internet Society, http://tools.ietf.org/html/rfc3307.

Bjorn Knutsson et al., "Peer-to-Peer Support for Massively Multiplayer Games," (article), Mar. 2004, 12 pages, In the 23rd Conference of the IEEE Communications Society (INFOCOM '04), Hong Kong, China.

Eric Karasuda et al., "Textual Annotation in a Head Tracked, Stereoscopic Virtual Design Environment," (article), Sep. 29, 2004, 10 pages, Proceedings of DETC'04 2004 ASME Design Engineering Technical Conferences, Salt Lake City, Utah, USA.

Evangelos P. Markatos, "Tracing a Large-Scale Peer to Peer System: An Hour in the Life of Gnutella," (article), 2002, 11 pages, Proc. Second IEEE/ACM Int'l Symp, Cluster Computing and the Grid.

Jean-Sebastien Boulanger, "Comparing Interest Management Algorithms for Massively Multiplayer Games," (article), Oct. 30-31, 2006, Proceedings of 5th ACM SIGCOMM Workshop on Network and System Support for Games, Singapore.

Jouni Smed et al., "A Review on Networking and Multiplayer Computer Games," (article), Apr. 2002, pp. 30, Technical Report No. 454, Turku Centre for Computer Science.

Kunwadee Sripanidkulchai, "The Popularity of Gnutella Queries and Its Implications on Scalability," (article), Feb. 2001, 7 pages, http://www.cs.cmu.edu/~kunwadee/research/p2p/gnutella.html.

No Author, Main Page—Solipsis, (website), obtained Feb. 6, 2007, 2 pages, http://solipsis.netofpeers.net/wiki2/index.php/Main_Page.

Mayank Mishra et al., "Performance enhancement with passive caching in Peer-to-peer systems," (article), date unknown, 10 pages.

Mojtaba Hosseini et al., "Visibility-based Interest Management in Collaborative Virtual Environments," (article), Sep. 30-Oct. 2, 2002, pp. 143-144, Proceedings of the 4th international conference on Collaborative virtual environments, Bonn, Germany.

No Author, "Multiverse Technology: An Overview," (article), 2005, 12 pages, http://www.multiverse.net/platform/whitepapers/mv_overview.pdf.

No Author, "About This Site—Thottbot: World of Warcraft," (website), obtained Feb. 27, 2009, http://thottbot.com/about.

No Author, "About Us—Wowhead," (website), obtained Feb. 27, 2009, 3 pages, http://www.wowhead.com/?aboutus.

No Author, "Allakhazam.com," (website), obtained Feb. 27, 2009, 18 pages, http://www.allakhazam.com/.

No Author, "Second Life—What is Second Life?", (website), obtained Feb. 27, 2009, 2 pages, http://secondlife.com/whatis/.

S. Bhattacharyya, "An Overview of Source-Specific Multicast (SSM)," (article), Jul. 2003, 13 pages, The Internet Society, http://tools.ietf.org/html/rfc3569.

Shun-Yun Hu et al., "Scalable Peer-to-Peer Networked Virtual Environment," (article), Aug. 2004, pp. 129-133, in Proc. 3rd ACM SIGCOMM 2004 workshops on NetGames '04.

Sunil Patro et al., "Transparent Query Caching in Peer-to-Peer Overlay Networks," (article), Apr. 22-26, 2003, 10 pages, In Proceedings of the 17th International Parallel and Distributed Processing Symposium (IPDPS), Nice, France.

Takuji Iimura et al., "Zoned Federation of Game Servers: a Peer-to-peer Approach to Scalable Multi-player Online Games," (article), Aug. 2004, pp. 116-120, in Proc. 3rd ACM SIGCOMM 2004 workshops on NetGames '04.

No Author, Uni-verse Home, (website), obtained Mar. 19, 2007, 4 pages, http://www.uni-verse.org/Uni-verse-Home.72.0.html.

Huang, Chung-Ming et al., "Network-Aware P2P File Sharing over the Wireless Mobile Networks," IEEE Journal on Selected Areas in Communications, vol. 25, No. 1, Jan. 2007, pp. 204-210.

* cited by examiner

COLLABORATIVE INFORMATION SHARING IN A VIRTUAL WORLD

FIELD OF THE INVENTION

The present invention relates to a system and method for providing a virtual world and more particularly relates to a system and method for collaboratively sharing information in a virtual world.

BACKGROUND OF THE INVENTION

Virtual worlds are growing in their complexity and their size. A user simply cannot know all that there is to know about the virtual world. For example, the user cannot know where in the virtual world desired virtual objects are located, how activities or tasks are to be performed in the virtual world, and the like. In order to address this issue, websites have emerged to enable users to share their thoughts about some virtual worlds. However, this solution is not optimal. A user participating in a virtual world must context switch out of the virtual world, start their web browser, navigate to the website or some type of search engine, enter search terms, typically sort through a large number of search results to find information of interest, and then context switch back to the virtual world. This process is extremely inefficient when the user frequently desires to search for new information. Thus, there is a need for a system and method of collaboratively sharing information in a virtual world.

SUMMARY OF THE INVENTION

The present invention relates to information sharing in a virtual world. In general, a virtual world client associated with a user participating in a virtual world operates to obtain one or more annotations associated with virtual world constructs identified as being of interest to the user. The virtual world constructs may be, for example, other users participating in the virtual world, avatars of other users participating in the virtual world, virtual objects within the virtual world, geographic regions of the virtual world, a task within the virtual world, or the like. The virtual world constructs of interest to the user may be identified by the user or identified automatically by the virtual world client. In one embodiment, the one or more annotations are defined by other users participating in the virtual world. Once the one or more annotations associated with the virtual world constructs of interest to the user are obtained, the virtual world client may, for example, present the one or more annotations to the user, present a portion of the one or more annotations to the user, notify the user that the one or more annotations are available, or the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to information sharing in a virtual world. In general, a virtual world client associated with a user participating in a virtual world operates to obtain one or more annotations associated with virtual world constructs identified as being of interest to the user. The virtual world constructs may be, for example, other users participating in the virtual world, avatars of other users participating in the virtual world, virtual objects within the virtual world, geographic regions of the virtual world, a task within the virtual world, or the like. The virtual world constructs of interest to the user may be identified by the user or identified automatically by the virtual world client. In one embodiment, the annotations are defined by other users participating in the virtual world. Once the one or more annotations associated with the virtual world constructs of interest to the user are obtained, the virtual world client may, for example, present the one or more annotations to the user, present a portion of the one or more annotations to the user, notify the user that the one or more annotations are available, or the like.

Figure 1:
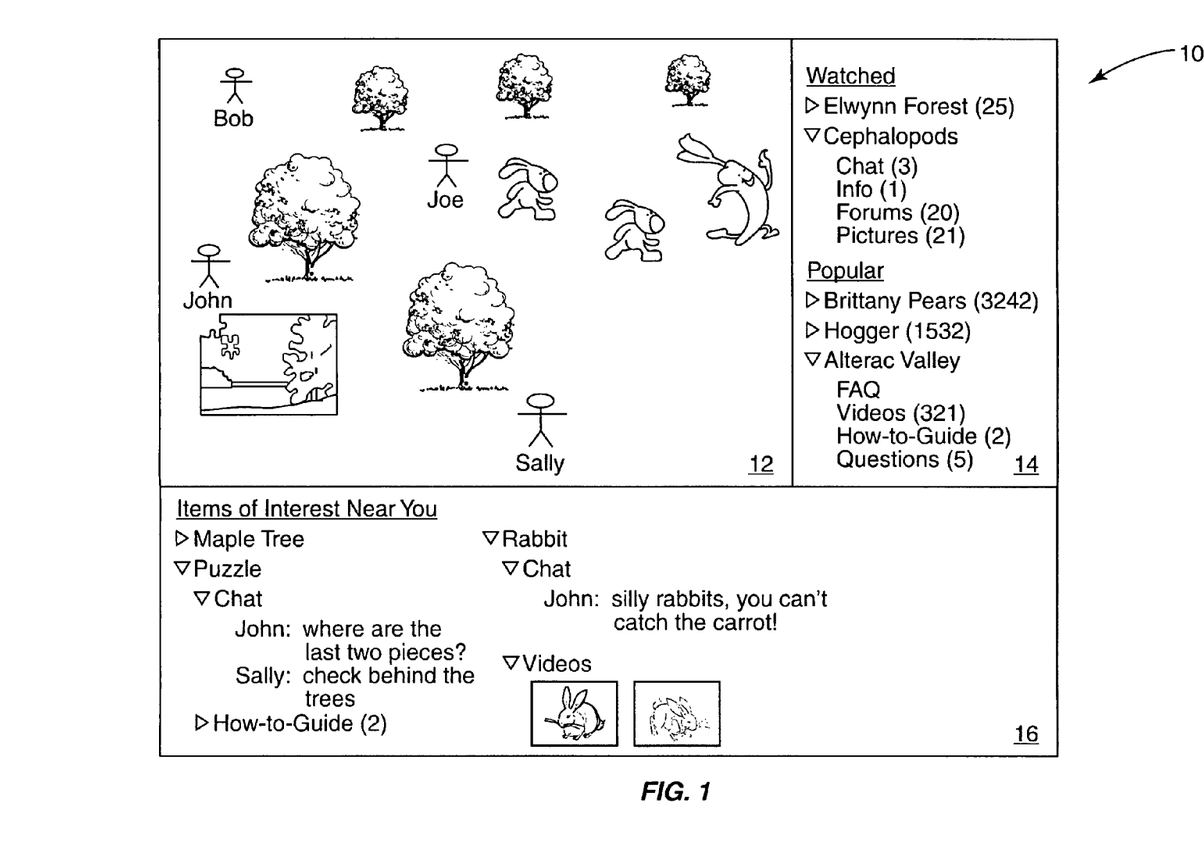
FIG. 1 is an exemplary Graphical User Interface (GUI) for presenting annotations to a user for virtual world constructs identified as being of interest to the user according to one embodiment of the present invention.

FIG. 1 illustrates an exemplary graphical user interface 10 provided by a virtual world client according to one embodiment of the present invention. As illustrated, the graphical user interface 10 includes a first display area 12 for displaying a relevant portion of a virtual world to an associated user. Using the first display area 12, the user is enabled to navigate through and participate in the virtual world. A second display area 14 is used to display information to the user associated with virtual world constructs identified by the user as being of interest. In this example, the user has identified the virtual world constructs "Elwynn Forest" and "Cephalopods" as being of interest. Thus, in response, the virtual world client obtains information associated with the virtual world constructs "Elwynn Forest" and "Cephalopods" and presents the information to the user in the second display area 14. This information preferably is or includes annotations for the virtual world constructs defined by users participating in the virtual world or otherwise associated with the virtual world. In this example, the second display area 14 also displays information, such as annotations, associated with one or more most popular virtual world constructs, which in this example are "Brittney Pears," "Hogger," and "Alterac Valley." A third display area 16 is used to display information to the user associated with virtual world constructs identified by the virtual world client as being of interest to the user. In this example, the virtual world client has identified the virtual world constructs "Maple Tree," "Puzzle," and "Rabbit" as being of interest to the user. After identifying the virtual world constructs that are of interest to the user, the virtual world client obtains associated information and presents the information to the user in the third display area 16. Again, this information preferably is or includes annotations defined by users participating in the virtual world or otherwise associated with the virtual world.

Figure 2:
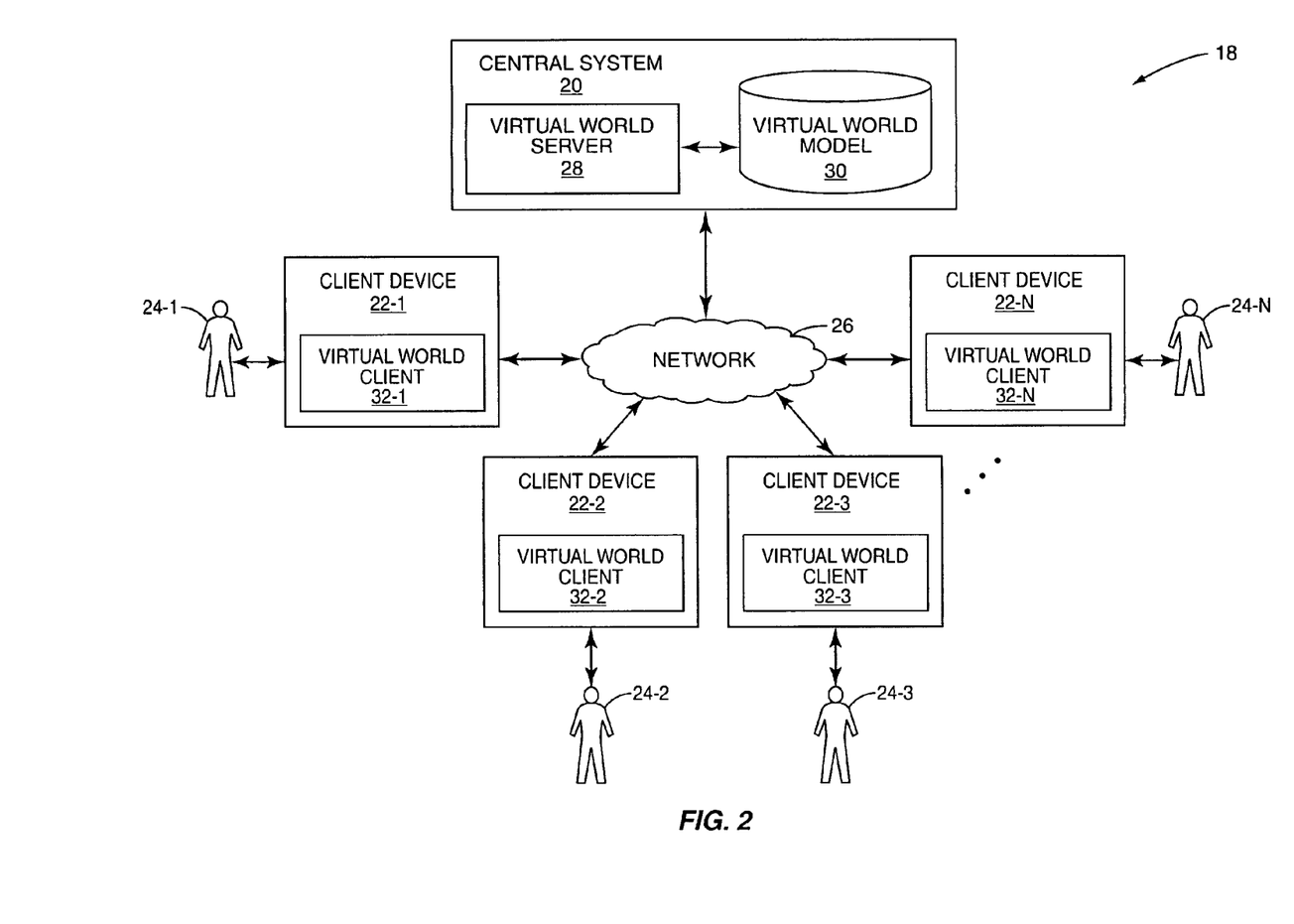
FIG. 2 illustrates a system implementing a virtual world in which annotations for virtual world constructs are created and shared according to one embodiment of the present invention.

FIG. 2 illustrates an exemplary system 18 hosting a virtual world in which information regarding virtual world constructs is collaboratively shared by users participating in, or otherwise associated with, the virtual world according to one embodiment of the present invention. The system 18 includes a central system 20 and a number of client devices 22-1 through 22-N having associated users 24-1 through 24-N. The central system 20 and the client devices 22-1 through 22-N are interconnected by a network 26. The network 26 may be a Wide Area Network (WAN), Local Area Network (LAN), or a combination thereof and may include wired components, wireless components, or both wired and wireless components.

In this embodiment, the central system 20 hosts a virtual world server 28 and a virtual world model 30. Note that while the central system 20 is illustrated as a single element in FIG. 2, the central system 20 may include any number of one or more central servers. The virtual world server 28 may be implemented in software or a combination of software and hardware. In this example, the virtual world server 28 operates to maintain the virtual world model 30, which is a model of the virtual world. The client devices 22-1 through 22-N may be, for example, personal computers, game consoles, or the like and generally include virtual world clients 32-1 through 32-N. The virtual world clients 32-1 through 32-N may be implemented in software or a combination of software and hardware.

The virtual world may be executed by the virtual world server 28 where the virtual world clients 32-1 through 32-N operate as interfaces to the virtual world for the users 24-1 through 24-N. In addition, as discussed below, the virtual world clients 32-1 through 32-N operate to identify virtual world constructs of interest to the users 24-1 through 24-N, obtain associated information, such as annotations, for the identified virtual world constructs, and present the associated information to the users 24-1 through 24-N. In another embodiment, execution of the virtual world may be distributed among the virtual world server 28 and the virtual world clients 32-1 through 32-N. In yet another embodiment, execution of the virtual world may be distributed among the virtual world clients 32-1 through 32-N. As an example, each of the virtual world clients 32-1 through 32-N may host a particular area or region of the virtual world in a manner similar to that described in commonly owned and assigned U.S. patent application Ser. Nos. 11/752,004, 11/768,668, 11/693,152, and 11/861,607, which are hereby incorporated herein by reference in their entireties.

Figure 3:
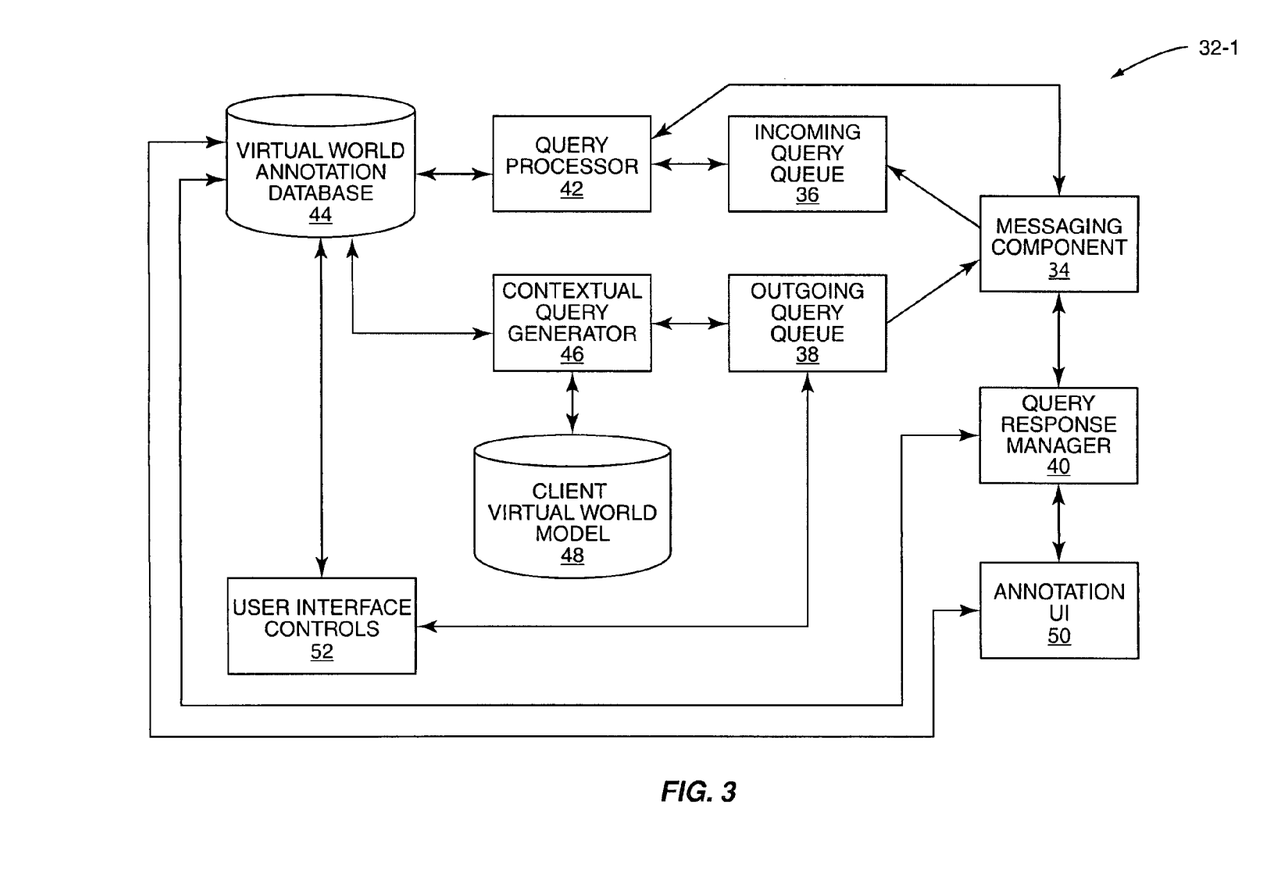
FIG. 3 is a functional block diagram of one of the virtual world clients of FIG. 2 according to one embodiment of the present invention.

FIG. 3 is a functional block diagram of the virtual world client 32-1 of FIG. 2 according to one embodiment of the present invention. This discussion is equally applicable to the other virtual world clients 32-2 through 32-N. The virtual world client 32-1 includes a messaging component 34. The messaging component 34 generally operates to enable communication between the virtual world client 32-1 and the other virtual world clients 32-2 through 32-N. In the preferred embodiment, the virtual world clients 32-1 through 32-N communicate via a Peer-to-Peer (P2P) overlay network built on top of the network 26 (FIG. 2). The virtual world clients 32-1 through 32-N may communicate in a true P2P manner or, alternatively, in a hybrid P2P manner where, for example, the virtual world server 28 operates as a proxy. As discussed below, messaging component 34 enables the virtual world client 32-1 to propagate queries for annotations for virtual world constructs identified as being of interest to the user 24-1. Note the queries may be propagated through the P2P overlay network using any desired query propagation technique.

More specifically, the messaging component 34 receives queries from the other virtual world clients 32-2 through 32-N and places the received queries into an incoming query queue 36. The message component 34 also obtains outgoing queries from an outgoing query queue 38 and propagates those queries to the other virtual world clients 32-2 through 32-N over the P2P overlay network. Lastly, the messaging component 34 receives responses to queries previously sent by the virtual world client 32-1 and sends the responses to a query response manager 40.

Considering the scenario where the virtual world client 32-1 has received a query for annotations for an identified virtual world construct from one of the other virtual world clients 32-2 through 32-N, the messaging component 34 first places the query in the incoming query queue 36. Next, a query processor 42 obtains the query from the incoming query queue 36 using, for example, a pop operation. The query processor 42 then processes the query to identify any results. More specifically, the query processor 42 processes the query by applying the query to a virtual world annotation database 44 to obtain any annotations for the identified virtual world construct stored in the virtual world annotation database 44. In this embodiment, the virtual world annotation database 44 includes annotations previously created by the user 24-1 and is preferably stored by the client device 22-1 or in association with the client device 22-1. In addition, the virtual world annotation database 44 may include annotations previously obtained by the virtual world client 32-1 for virtual world constructs of interest to the user 24-1. Once results for the query are obtained by the query processor 42, the query processor 42 sends a response including the results of the query to the originating virtual world client. The response may be sent directly to the originating virtual world client or propagated to the originating virtual world client via the P2P overlay network.

Now, considering the scenario where a query is generated and sent by the virtual world client 32-1, the virtual world client 32-1 generates queries for annotations for virtual world constructs identified as being of interest to the user. More specifically, a contextual query generator 46 automatically, or programmatically, generates queries for virtual world constructs identified by the contextual query generator 46 as being of interest to the user 24-1. While the operation of the contextual query generator 46 is discussed below in detail, the contextual query generator 46 generally operates to identify virtual constructs of interest to the user 24-1 based on virtual world information. This virtual world information may include information from a client virtual world model 48. The client virtual world model 48 preferably includes a portion of the virtual world model 30 (FIG. 2) that is relevant to the user 24-1. The information in the client virtual world model 48 may vary depending on the particular implementation of the virtual world. For example, the client virtual world model 48 may include information identifying or describing landscape features such as buildings, bodies of water, trees, mountains, and the like; virtual objects such as animals, avatars, and the like; weather conditions; and the like.

Upon identifying virtual world constructs of interest to the user 24-1, the contextual query generator 46 may first query the virtual world annotation database 44 to determine whether annotations for the virtual world constructs are available in the virtual world annotations database 44. In addition, the contextual query generator 46 may determine whether any annotations for the virtual world constructs already stored in the virtual world annotation database 44 remain relevant to the virtual world constructs by, for example, considering a date upon which the annotations were created, a date upon which the annotations were obtained by the virtual world client 32-1 and stored in the virtual world annotation database 44, whether the annotations have already been consumed by the user 24-1, or the like. As used herein, "consume" is a general term meaning that the user 24-1 has viewed, listened to, or read information from an annotation with its exact meaning varying depending on the type of information included in the annotation. If the contextual query generator 46 determines that more annotations are needed, the contextual query generator 46 generates one or more queries for annotations for the virtual world constructs and places the one or more queries in the outgoing query queue 38. The messaging component 34 obtains the one or more queries from the outgoing query queue 38 and propagates the one or more queries to the other virtual world clients 32-2 through 32-N via the P2P overlay network.

Thereafter, one or more responses to the query are received by the messaging component 34 and provided to the query response manager 40. In this embodiment, upon receiving a response to a query, the query response manager 40 stores the results, which include one or more annotations, in the virtual world annotation database 44. In addition to storing the results to the query in the virtual world annotation database 44, the query response manager 40 notifies an annotation user interface component 50 that new annotations are available.

In addition to context-based queries, the virtual world client 32-1 may generate and send queries for annotations for virtual world constructs identified by the user 24-1 as being of interest to the user 24-1. More specifically, a user interface controls component 52 generally operates to enable the user 24-1 to provide various user input. One type of user input is input from the user 24-1 for indicating virtual world components of interest to the user 24-1. Thus, the user interface controls component 52 enables the user 24-1 to select one or more virtual world constructs of interest to the user 24-1. For example, the user 24-1 may select a virtual world construct from a menu, right-click on a virtual world construct and select a menu item such as "get annotations," or the like. In response, the user interface controls component 52 may first determine whether sufficient annotations are already stored in the virtual world annotation database 44. If not, the user interface controls component 52 generates a query for annotations for the selected virtual world construct and places the query in the outgoing query queue 38. From this point, the process proceeds as described above. The messaging component 34 obtains the query from the outgoing query queue 38 and propagates the query to the other virtual world clients 32-2 through 32-N. The messaging component 34 then sends any responses to the query to the query response manager 40. The query response manager 40 stores the results of the query in the virtual world annotation database 44 and notifies the annotation user interface component 50 of the new information in the virtual world annotation database 44.

Note that, in addition to querying the other virtual world clients 32-2 through 32-N for annotations for the virtual world constructs identified as being of interest to the user 24-1, the virtual world client 32-1 may also query one or more third-party systems for information related to the virtual world constructs. Any information obtained from the third-party systems may be added to existing annotations or used to create new annotations. The third-party systems may be, for example, content sharing systems such as audio, video, or image sharing systems, websites, or the like. In an alternative embodiment, the virtual world client 32-1 may be configured or implemented such that it only searches third-party systems for information related to the virtual constructs of interest to the user 24-1 rather than querying the other virtual world clients 32-2 through 32-N.

The annotation user interface component 50 generally operates to present, to the user 24-1, annotations for virtual world constructs of interest to the user 24-1. Again, these annotations may be annotations for virtual world constructs identified as being of interest to the user 24-1 by the contextual query generator 46 and/or annotations for virtual world constructs identified by the user 24-1 as being of interest. The manner in which the annotations are presented to the user 24-1 may vary depending on the particular implementation. For example, the user 24-1 may first be presented with some sort of indicator that annotations are available for the associated virtual world constructs. The indicator may indicate the number of annotations available and/or types of annotations available. The user 24-1 may then be enabled to explore the annotations during which time the user 24-1 may view the annotations if desired. Alternatively, the annotations, a select number of the annotations, or select portions of the annotations may be presented to the user 24-1. For example, the user 24-1 may first be presented with a number of annotations having the highest rating, annotations created by select users such as other users in a social network of the user 24-1 or friends of the user 24-1, or the like. If additional annotations are available in the virtual world annotation database 44, the user 24-1 may be enabled to view these additional annotations if desired.

Figure 4:
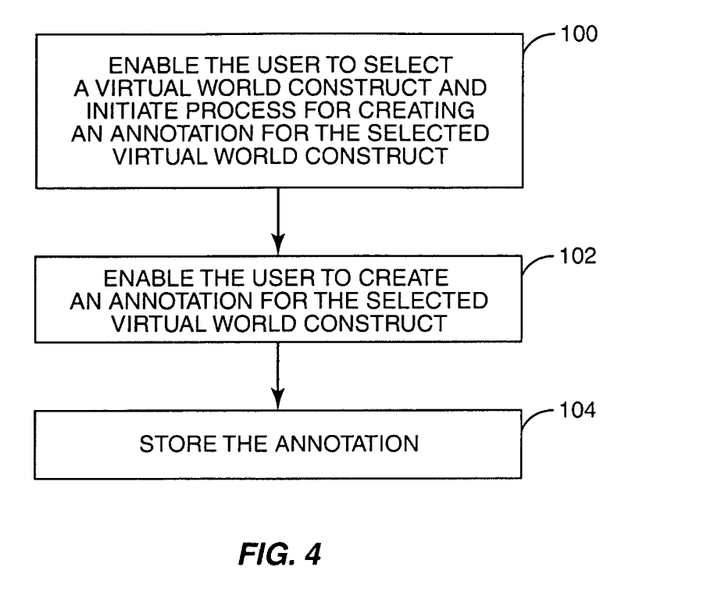
FIG. 4 is a flow chart illustrating a process for creating an annotation for a virtual world construct according to one embodiment of the present invention.

FIG. 4 is a flow chart illustrating a process for creating an annotation for a virtual world construct according to one embodiment of the present invention. This process is preferably performed by the user interface controls component 52 of FIG. 3. Note that while the following discussion uses the virtual world client 32-1 as an example, the discussion is equally applicable to the other virtual world clients 32-2 through 32-N. First, the virtual world client 32-1, and more specifically the user interface controls component 52, enables the user 24-1 to select a virtual world construct and initiate a process for creating an annotation for the selected virtual world construct (step 100). The virtual world construct may be, for example, another one of the users 24-2 through 24-N, an avatar of another one of the users 24-2 through 24-N, a virtual object in the virtual world, an activity performed in the virtual world, a task performed in the virtual world, a geographic region of the virtual world, a landscape element in the virtual world, weather in the virtual world, or the like. The user 24-1 may be enabled to select the virtual world construct by, for example, selecting the virtual world construct from a menu, right-clicking on the virtual world construct and selecting a "create annotation" item from a resulting menu, or the like.

Figure 5:
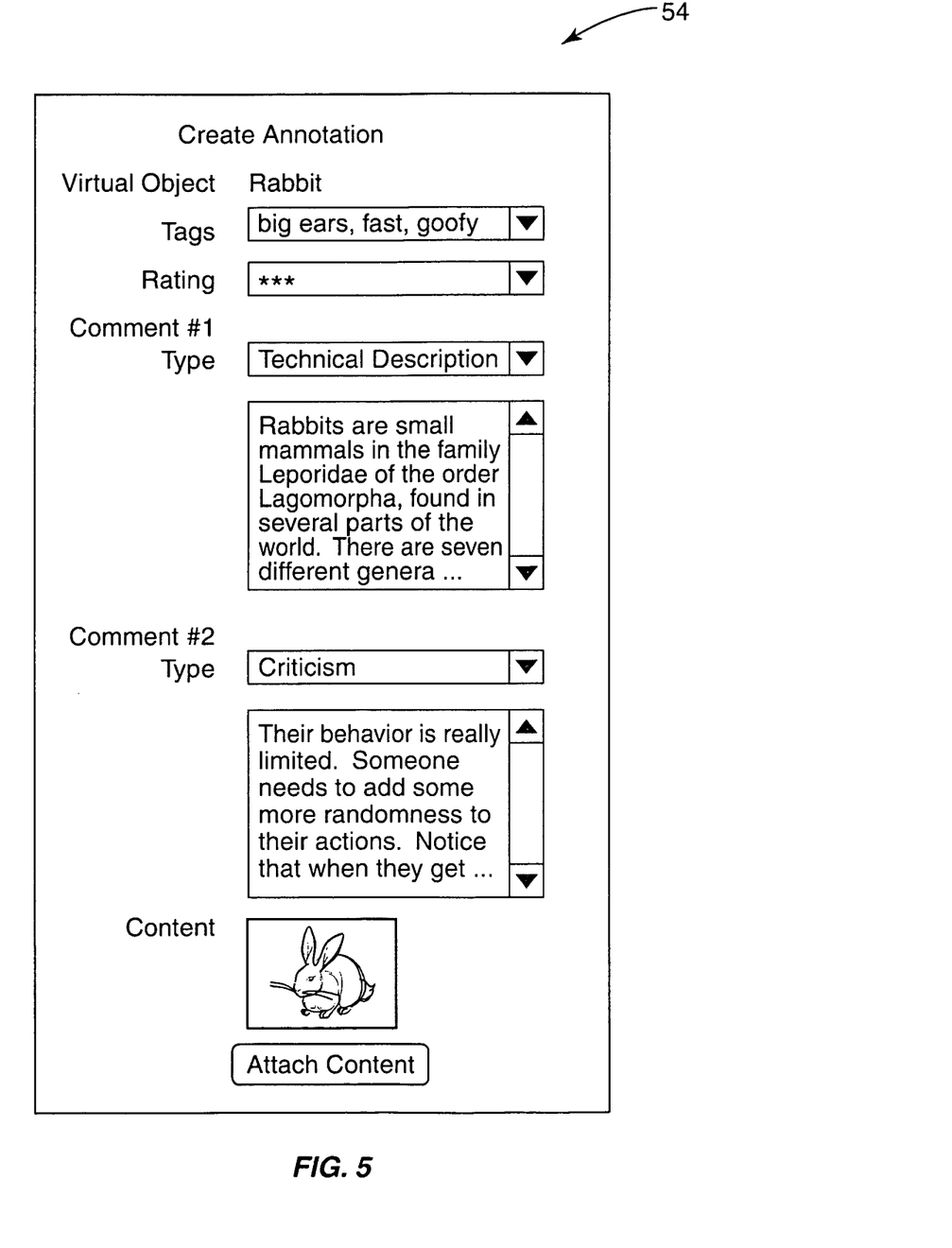
FIG. 5 is an exemplary GUI enabling a user to create an annotation for a virtual world construct according to one embodiment of the present invention.

Next, the virtual world client 32-1, and more specifically the user interface controls component 52, enables the user 24-1 to create an annotation for the selected virtual world construct (step 102). An exemplary graphical user interface 54 that may be used to enable the user 24-1 to create the annotation is shown in FIG. 5. As illustrated, the graphical user interface 54 enables the user to define one or more tags, which may be keywords, to be associated with the virtual world construct, a rating for the virtual world construct, a number of comments regarding the virtual world construct, indicators of a type of each of the comments, and content or references to content associated with the virtual world construct. The content shown is a picture. However, the annotation may additionally or alternatively include other types of content or references to other types of content such as, for example, video content; audio content; text-based content such as, for example, blogs, chat sessions, or chat rooms; a webpage or website; or the like. Returning to FIG. 4, after creating the annotation, the annotation is stored in association with an identifier of the virtual world construct in the virtual world annotation database 44 (FIG. 3) (step 104).

Figure 6:
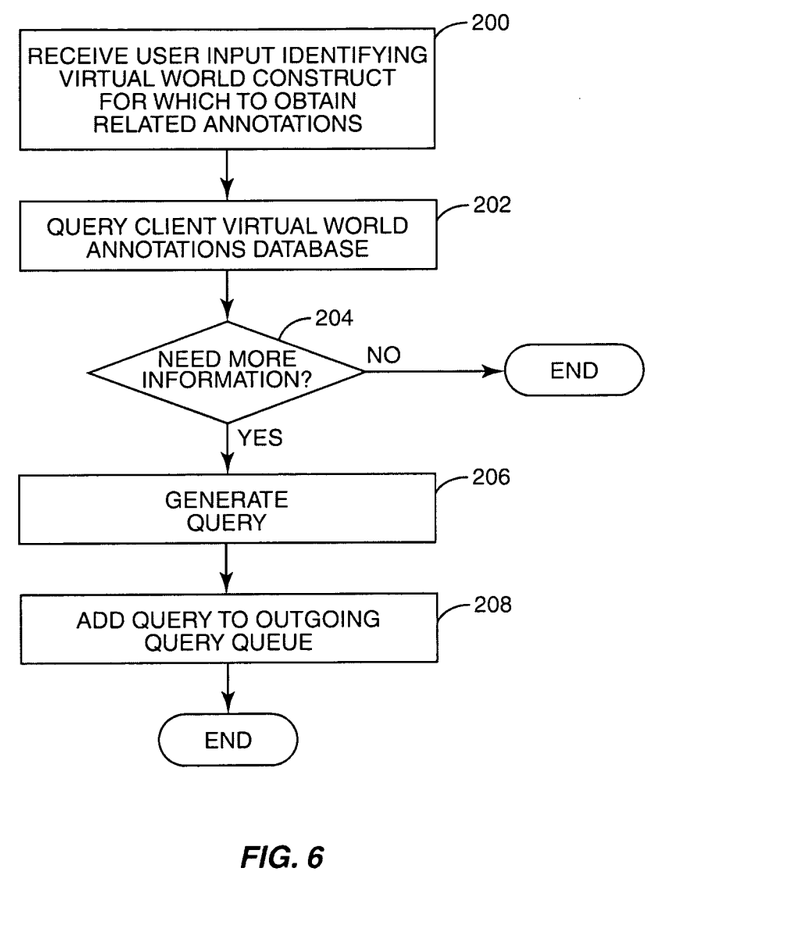
FIG. 6 is a flow chart illustrating a process for generating a query for annotations for a virtual world construct identified by a user as being of interest according to one embodiment of the present invention.

FIG. 6 is a flow chart illustrating the operation of the user interface controls component 52 to generate a query in response to user identification of a virtual world construct of interest to the user 24-1 according to one embodiment of the present invention. First, the user interface controls component 52 receives a user input from the user 24-1 identifying a virtual construct of interest to the user 24-1 (step 200). The user interface controls component 52 then queries the virtual world annotation database 44 to determine whether any annotations for the identified virtual world construct are already available in the virtual world annotation database 44 (step 202). Next, the user interface controls component 52 determines whether more information or annotations are needed for the identified virtual world construct (step 204). More specifically, the user interface controls component 52 may determine whether any annotations already stored in the virtual world annotation database 44 for the identified virtual world construct are still relevant. The relevancy of an annotation may be determined based on, for example, an amount of time that has elapsed since the annotation was created, an amount of time that has elapsed since the annotation was obtained by the virtual world client 32-1 in response to a previous query, whether the user 24-1 has already viewed or otherwise consumed the annotation, user history, rating, or the like. With respect to user history, historical information regarding other annotations previously viewed or not viewed by the user 24-1 may be used to determine whether a particular annotation is relevant to the user 24-1. Note that one or more rules may be defined by the user 24-1 for determining when new annotations are to be obtained. For example, the user 24-1 may define a rule stating that if there are no annotations for the identified virtual world construct stored in the virtual world annotation database 44 having a rating of at least 4/5 and that has not already been viewed by the user 24-1, then more annotations for the identified virtual world construct are needed.

If no more annotations are needed, the process ends. Otherwise, the user interface controls component 52 then generates a query for annotations for the identified virtual world construct (step 206) and adds the query to the outgoing query queue 38 (step 208). The user interface controls component 52 may also generate one or more queries for annotations for related virtual world constructs. For example, if the identified virtual world construct is "swimming," the user interface controls component 52 may also generate a query for "drowning." At this point, the process ends.

Figure 7:
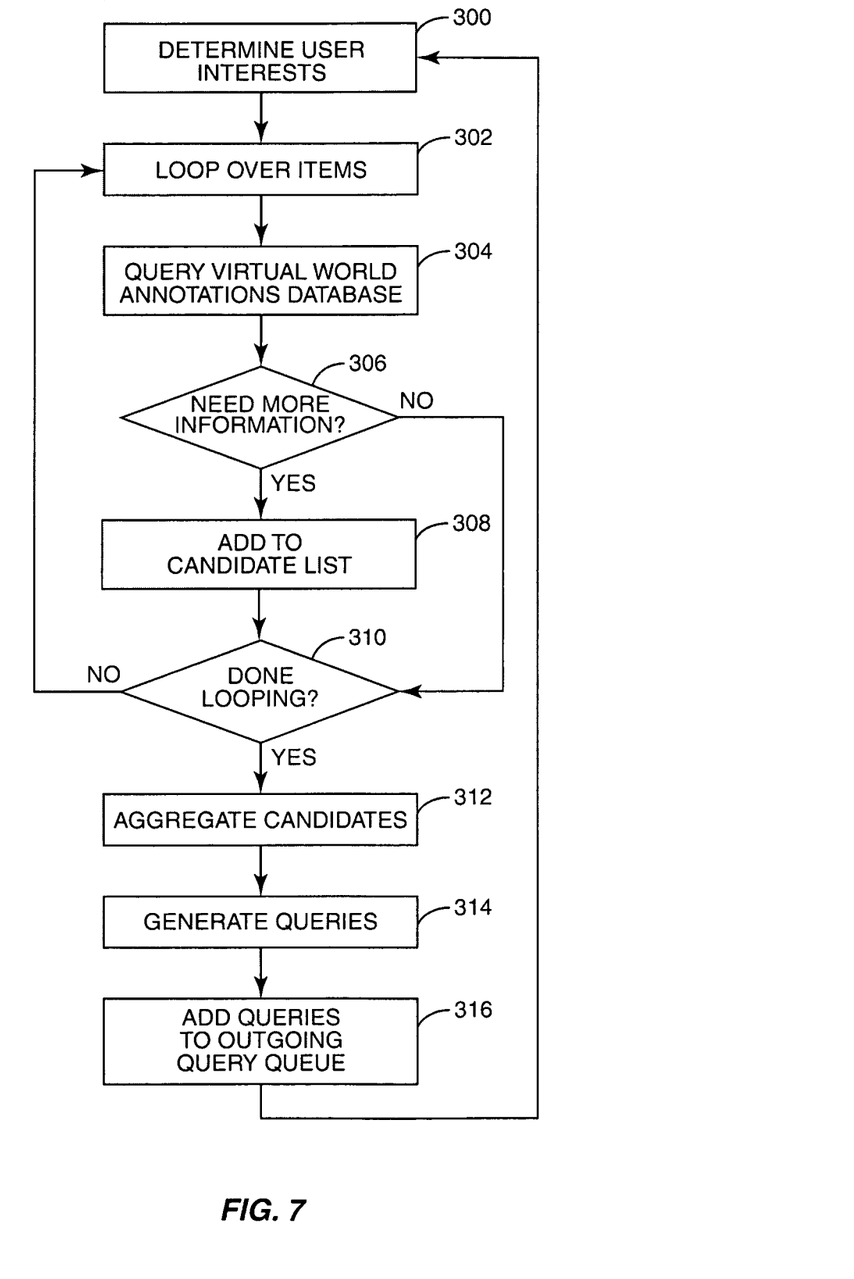
FIG. 7 is a flow chart illustrating a process for generating queries for annotations for virtual world constructs automatically, or programmatically, identified as being of interest to the user based on virtual world information according to one embodiment of the present invention.

FIG. 7 is a flow chart illustrating the operation of the contextual query generator 46 of FIG. 3 according to one embodiment of the present invention. In this embodiment, the contextual query generator 46 first determines user interests or, in other words, identifies one or more virtual world constructs of interest to the user (step 300). Note that, in one embodiment, if a state of the virtual world client 32-1 indicates that, for example, the user 24-1 is away from the client device 22-1 or is otherwise unavailable, the contextual query generator 46 may determine that the user 24-1 has no interests at that time. The contextual query generator 46 may then enter a sleep state until the user 24-1 is available. Alternatively, the operation of the contextual query generator 46 may proceed regardless of whether the user 24-1 is or is not available.

In order to identify virtual world constructs of interest, the contextual query generator 46 generally operates to examine a state of the avatar representing the user 24-1 in the virtual world, the client virtual world model 48 of the virtual world client 32-1, or both. The state of the avatar of the user 24-1 may include, for example, information identifying an action or task being performed by the avatar of the user 24-1, information identifying a health of the avatar of the user 24-1, information identifying virtual objects associated with the avatar of the user 24-1 such as virtual objects carried by the avatar of the user 24-1, or the like. Note, however, that the state information may vary depending on the implementation of the virtual world.

More specifically, the contextual query generator 46 may first examine the state of the avatar of the user 24-1 to identify virtual world constructs of interest to the user. For example, the state information may indicate that the avatar of the user 24-1 is currently engaged in performing a particular task such as solving a puzzle, participating in a chat conversation, riding a motorcycle, sleeping in a bed, or the like. Based on this state information, the contextual query generator 46 may then identify the task of solving the puzzle, the puzzle, a topic of the chat conversation, the task of riding a motorcycle, a motorcycle, the task of sleeping in a bed, and a bed as virtual world constructs of interest to the user 24-1.

In one embodiment, the examination of the state information is made using a number of state concepts (hereinafter concepts) each defined by associated analysis code. For example, "swimming" may be defined as a concept, where the analysis code determines whether the location of the avatar of the user 24-1 is within a body of water. If so, the contextual query generator 46 identifies "swimming" as a virtual world construct of interest to the user 24-1. Further, the concept of "swimming" may be related to other concepts via an ontology, taxonomy, or similar data structure. For example, the concepts used for analysis may be organized in an ontology where each concept corresponds to a node in the ontology and is related to one or more other concepts/nodes in the ontology. Thus, in this example, the "swimming" concept may also be related to other concepts such as, for example, "drowning," "surfing," "scuba diving," or the like. Thus, the contextual query generator 46 may identify "drowning," "surfing," and "scuba diving" as additional virtual world constructs of interest to the user 24-1. Note that the user 24-1 may be enabled to configure the maximum number of degrees of separation for identifying additional virtual constructs of interest to the user 24-1 using the ontology or similar data structure. For example, the user 24-1 may configure the contextual query generator 46 such that only concepts within one degree of separation (directly related) to a concept satisfied by the state information of the avatar of the user 24-1 are to be identified as additional virtual world constructs of interest to the user 24-1.

In addition to examining the state of the avatar of the user 24-1, the contextual query generator 46 may also query the client virtual world model 48 of the virtual world client 32-1 and, optionally, the virtual world model 30 at the central system 20 (FIG. 2). More specifically, in one embodiment, the contextual query generator 46 may query the client virtual world model 48 and, optionally, the virtual world model 30 to identify additional virtual world constructs within an area of the virtual world relevant to the avatar of the user 24-1 such as an Area of Interest (AOI) of the avatar of the user 24-1. In one embodiment, the AOI of the avatar 24-1 is a geographic area of the virtual world perceived by the avatar of the user 24-1. Thus, for example, other avatars within the AOI of the avatar of the user 24-1, the users represented by other avatars within the AOI of the avatar of the user 24-1, virtual objects within the AOI of the avatar of the user 24-1, weather at the location of the avatar of the user 24-1, or the like may be identified as being of interest to the user 24-1.

Note that the user 24-1 may define rules to assist the contextual query generator 46 in identifying virtual world constructs of interest to the user 24-1. For example, the user 24-1 may define one or more virtual world constructs or types of virtual world constructs that are never to be identified as being of interest to the user 24-1 regardless of whether those virtual world constructs or types of virtual world constructs are within the AOI of the avatar of the user 24-1. As another example, the user 24-1 may define rules stating that no virtual world constructs more than a defined distance from the avatar of the user 24-1 within the virtual world are to be identified as being of interest to the user 24-1. As a final example, the user 24-1 may define rules identifying one or more virtual world constructs or types of virtual world constructs that are to be identified as being of interest to the user 24-1 only if they are within a defined distance from the avatar of the user 24-1 within the virtual world. In addition or alternatively, the contextual query generator 46 may infer rules from historical information such as the annotations previously consumed or viewed by the user 24-1.

After identifying the virtual world constructs of interest to the user 24-1, the contextual query generator 46 begins to loop over the identified virtual world constructs to determine whether additional information or annotations are needed (step 302). For the first virtual world construct identified as being of interest to the user 24-1, the contextual query generator 46 queries the virtual world annotation database 44 to determine whether any annotations for the virtual world construct are already stored in the virtual world annotation database 44 (step 304). The contextual query generator 46 then determines whether additional information or annotations are needed for the virtual world construct (step 306). More specifically, the contextual query generator 46 may determine whether any annotations already stored in the virtual world annotation database 44 for the virtual world construct are still relevant. The relevancy of an annotation may be determined based on, for example, an amount of time that has elapsed since the annotation was created, an amount of time that has elapsed since the annotation was obtained by the virtual world client 32-1 in response to a previous query, whether the user 24-1 has already viewed or otherwise consumed the annotation, user history, rating, or the like. Note that one or more rules may be defined by the user 24-1 for determining when new annotations are to be obtained. For example, the user 24-1 may define a rule stating that if there are no annotations for the virtual world construct stored in the virtual world annotation database 44 having a rating of at least 4/5 and that has not already been viewed by the user 24-1, then more annotations for the identified virtual world construct are needed.

If no more annotations are needed, the process proceeds to step 312. If more annotations are needed, the contextual query generator 46 adds the virtual world construct to a candidate list (step 308). At this point, whether proceeding from step 306 or 308, the contextual query generator 46 determines whether looping is complete (step 310). In other words, the contextual query generator 46 determines whether it has reached the last virtual world construct identified as being of interest to the user 24-1. If not, the process returns to step 304 and is repeated.

Once all of the virtual world constructs identified as being of interest to the user 24-1 are processed, the contextual query generator 46 may optionally aggregate the candidate list (step 312). This may be desirable in order to reduce the number of queries to be generated and sent by the virtual world client 32-1. The candidate list may be aggregated by combining related virtual world constructs into a single query item. For example, "swimming" and "drowning" may be collapsed into a "swimming" query that includes a directive that indicates that query recipients should include any results for concepts within two nodes of the swimming node in the ontology of concepts. As another example, "octopus," "squid," and "cuttlefish" virtual world constructs may be collapsed such that a single query is to be issued for "cephalopods." After aggregating the candidate list, the contextual query generator 46 generates queries for the virtual world constructs in the aggregated candidate list (step 314) and places the queries in the outgoing query queue 38 (step 316). The contextual query generator 46 may coordinate with the outgoing query queue 38 to remove duplicate queries and prevent resubmission of queries that have been recently sent. At this point, the process returns to step 300 and is repeated.

It should be noted that the user 24-1 may be enabled to configure the types of information and amount of information to be retrieved. For example, the user 24-1 may configure the contextual query generator 46 to obtain only annotations including certain types of information such as a brief description, Frequency Asked Questions (FAQs), related audio or video content, communications activities (chats, forums, blogs, etc.), or the like. The user 24-1 may define additional rules such as a rule giving a minimum user rating, a rule indicating that annotations are only to be obtained from other users within a social network of the user 24-1, or the like. These additional rules may be a global set of rules. Alternatively, these additional rules may be defined for each type of information. Also note that if the user 24-1 desires only certain types of information, the annotations retrieved by the virtual world client 32-1 may be filtered to remove unwanted information at the source of the annotations or at the virtual world client 32-1. As an alternative, the annotations may not be filtered, but only the desired information is presented to the user 24-1.

Figure 8:
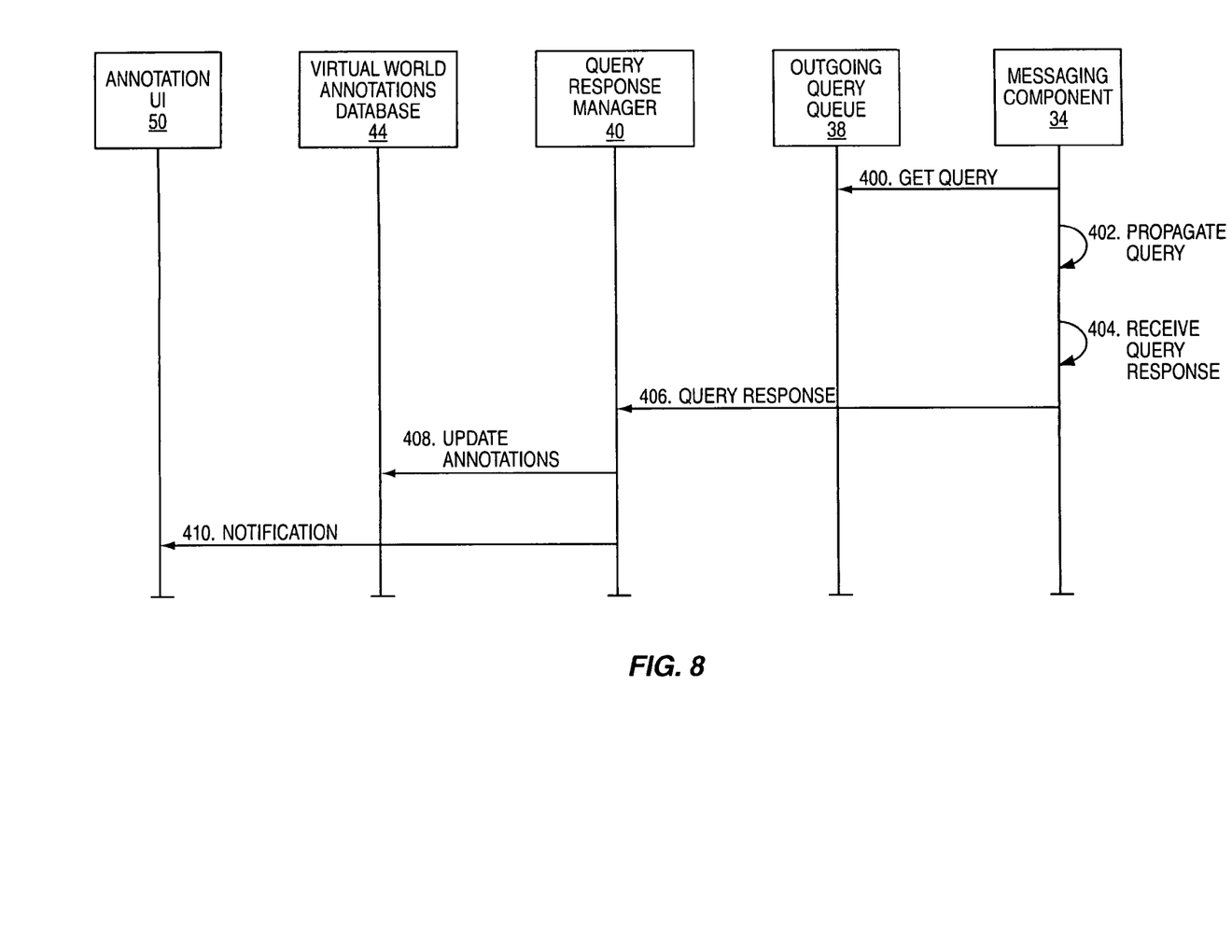
FIG. 8 illustrates the operation of the virtual world client of FIG. 3 to issue a query for annotations and process a response to the query according to one embodiment of the present invention.

FIG. 8 illustrates a process for issuing a query and processing a response to the query according to one embodiment of the present invention. First, the messaging component 34 obtains a query for annotations for a virtual world construct from the outgoing query queue 38 (step 400) and propagates the query to the other virtual world clients 32-2 through 32-N (step 402). The query may be propagated using any desired query propagation technique. At some time thereafter, the messaging component 34 receives a response to the query (step 404) and sends the response to the query response manager 40 (step 406). The query response manager 40 then updates the virtual world annotation database 44 with the annotations received in the response (step 408) and notifies the annotation user interface component 50 of the new information in the virtual world annotation database 44 (step 410).

Figure 9:
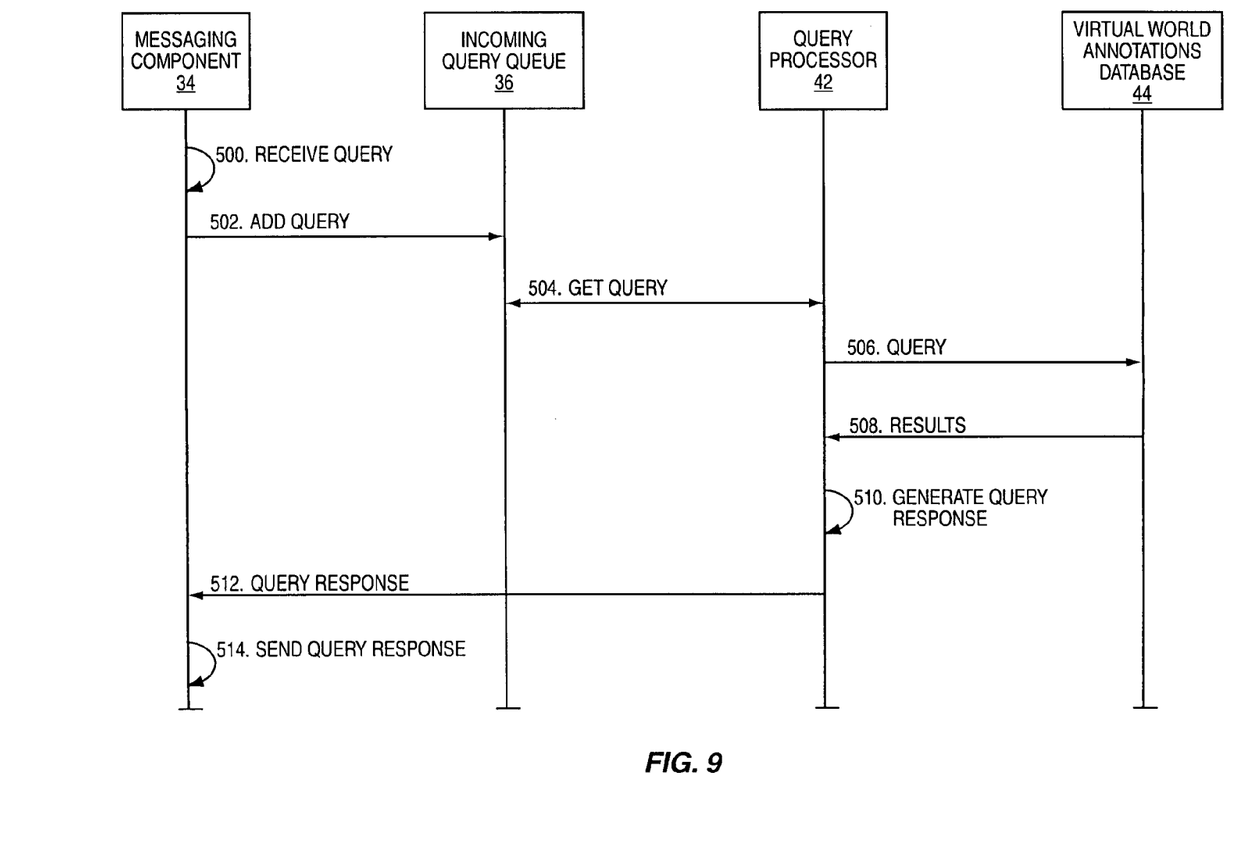
FIG. 9 illustrates the operation of the virtual world client of FIG. 3 to process a query for annotations received from another virtual world client and generate a response to the query according to one embodiment of the present invention.

FIG. 9 illustrates a process for receiving a query, processing the query, and sending a response to the query according to one embodiment of the present invention. First, the messaging component 34 receives a query for annotations for a virtual world construct issued by one of the other virtual world clients 32-2 through 32-N (step 500). Upon receiving the query, the messaging component 34 adds the query to the incoming query queue 36 (step 502). The query processor 42 then obtains the query from the incoming query queue 36 (step 504). The query processor 42 then queries the virtual world annotation database 44 to identify annotations created by the user 24-1 or previously obtained in response to queries issued by the virtual world client 32-1 satisfying the query (step 506). Note the query may include information identifying the virtual world construct for which annotations are desired as well as additional criteria. The additional criteria may include information indicating that annotations for other virtual world constructs within a defined number of degrees of separation from the identified virtual world construct are also desired. The additional criteria may additionally or alternatively include information indicating that only annotations with defined types of information are to be returned, that only portions of annotations including defined types of information are to be returned rather than the full annotations, or the like. Still further, the additional criteria may additionally or alternatively include information identifying a minimum user rating for annotations, information indicating that annotations are only to be returned if they are created by a user within a social network of the originating user, or the like.

In response to the query, the query processor 42 receives results from the virtual world annotation database 44 (step 508). The query processor 42 then generates a query response including the results from the virtual world annotation database 44 (step 510). The query processor 42 then sends the query response to the messaging component 34 (step 512), and the messaging component returns the query response to the originating virtual world client (step 514). The query response may be sent to the originating virtual world client directly or propagated back to the originating virtual world client via the P2P overlay network.

Figure 10:
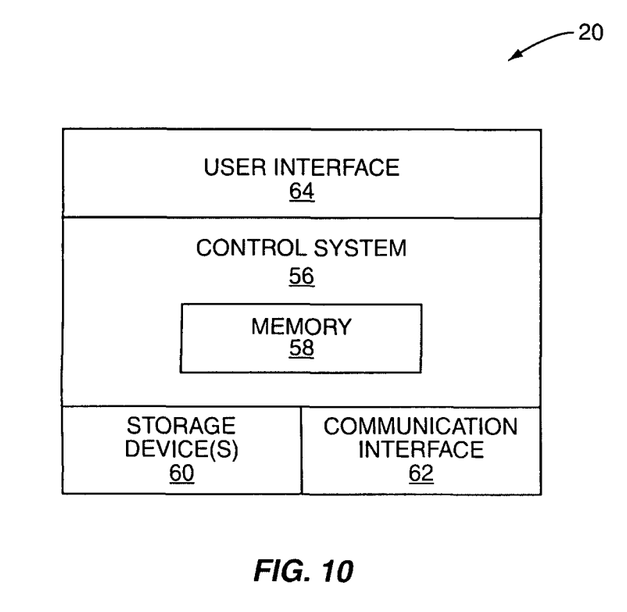
FIG. 10 is a block diagram of an exemplary implementation of the central system of FIG. 2.

FIG. 10 is a block diagram of an exemplary implementation of the central system 20 of FIG. 2 according to one embodiment of the present invention. In general, the central system 20 includes a control system 56 having associated memory 58. In one embodiment, the virtual world server 28 (FIG. 2) is implemented in software and stored in the memory 58. In addition, all or a portion of the virtual world model 30 may be stored in the memory 58. The central system 20 may also include one or more digital storage devices 60 such as, for example, one or more hard disk drives. In one embodiment, the virtual world model 30 is stored in the one or more digital storage devices 60. However, all or a portion of the virtual world model 30 may additionally or alternatively be stored in the memory 58. The central system 20 also includes a communication interface 62 communicatively coupling the central system 20 to the network 26 (FIG. 1). Lastly, the central system 20 includes a user interface 64, which may include a display, one or more user input devices, or the like.

Figure 11:
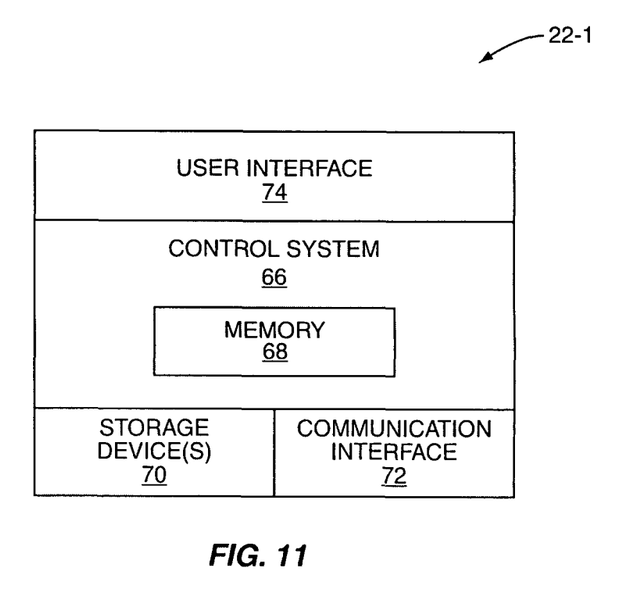
FIG. 11 is a block diagram of an exemplary implementation of one of the client devices of FIG. 2.

FIG. 11 is a block diagram of an exemplary implementation of the client device 22-1 of FIG. 2 according to one embodiment of the present invention. This discussion is equally applicable to the other client devices 22-2 through 22-N. In general, the client device 22-1 includes a control system 66 having associated memory 68. In one embodiment, the virtual world client 32-1 (FIG. 2) is implemented at least partially in software and stored in the memory 68. Note that all or a portion of the client virtual world model 48 (FIG. 3) and the virtual world annotation 44 (FIG. 3) may be stored in the memory 68. The client device 22-1 may also include one or more digital storage devices 70 such as, for example, one or more hard disk drives. In one embodiment, the client virtual world model 48 and the virtual world annotation database 44 are stored in the one or more digital storage devices 70. However, all or a portion of the client virtual world model 48 and the virtual world annotation database 44 may additionally or alternatively be stored in the memory 68. The client device 22-1 also includes a communication interface 72 communicatively coupling the client device 22-1 to the network 26 (FIG. 1). Lastly, the client device 22-1 includes a user interface 74, which includes a display, one or more user input devices, and the like.

The present invention provides substantial opportunity for variation without departing from the scope of the present invention. For example, in a first alternative embodiment, at least some of the functionality of the virtual world clients 32-1 through 32-N may be implemented in the virtual world server 28 (FIG. 2). More specifically, for instance, the contextual query generator 46 may be implemented in the virtual world server 28. As such, the contextual query generator 46 may operate as described above to examine the state of the avatar of the user 24-1 and the virtual world model 30 to identify virtual world constructs of interest to the user 24-1. The contextual query generator 46 may then query the virtual world annotation databases 44 of the other virtual world clients 32-2 through 32-N to obtain annotations for the identified virtual world constructs. Alternatively, the virtual world server 28 may maintain a global annotation database storing annotations created by the users 24-1 through 24-N. In this case, the contextual query generator 46 may query the global annotation database rather than those maintained by the virtual world clients 32-2 through 32-N at the client devices 22-2 through 22-N.

As another example, the virtual world clients 32-1 through 32-N may be implemented as the virtual world server 28. For example, the virtual world server 28 may create or allocate virtual world clients for each of the users 24-1 through 24-N. At the client devices 22-1 through 22-N, client applications would operate to provide an interface to the virtual world for the users 24-1 through 24-N by enabling the users 24-1 through 24-N to view and interact with the virtual world and annotations presented in association with the virtual world. The virtual world clients 32-1 through 32-N would then operate at the central system 20 to identify virtual world constructs of interest to the users 24-1 through 24-N, obtain annotations for the identified virtual world constructs from one or more of the virtual world annotation databases 44 which are now stored at the central system 20, and provide the annotations to the client devices 22-1 through 22-N for presentation to the users 24-1 through 24-N in association with the virtual world.

As another example, the virtual world clients 32-1 through 32-N may be implemented as shown above with respect to FIG. 2. However, rather than maintaining the virtual world annotation databases 44 at the client devices 22-1 through 22-N, the annotations may be stored at the central system 20. More specifically, the annotations created by the users 24-1 through 24-N may be stored in a global annotations database. Alternatively, the annotations created by each of the users 24-1 through 24-N may be stored separately. Still further, the virtual world server 28 may simply operate to store the virtual world annotation databases 44 for the virtual world clients 32-1 through 32-N at the central system 20. Regardless of how the annotations are stored at the central system 20, the virtual world clients 32-1 through 32-N query the virtual world server 28, or alternatively the annotation database(s) themselves, for annotations when needed during operation. As such, in this alternative embodiment, there would be no need for P2P communication for purposes of obtaining annotations.

Lastly, while the discussion above focuses on annotations, the present invention is not limited thereto. Information, in any format, may be obtained for the virtual world constructs identified as being of interest to the user. The information is not required to be an annotation. For example, the virtual world client 32-1 may automatically, or programmatically, identify one or more virtual world constructs of interest to the user 24-1 based on virtual world information, as described above. The virtual world client 32-1 may then query a remote system such as, for example, a website, Internet search engine, or the like, for information regarding the one or more virtual world constructs. The information returned by the remote system may then be presented to the user 24-1 or stored such that the user 24-1 can access the information as desired.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    automatically identifying a first virtual world construct of interest to a user associated with an avatar within a virtual world based on an activity with which the avatar is actively engaged within the virtual world where the first virtual world construct of interest is based on predefined information associated with the user;
    querying a plurality of virtual world clients associated with a plurality of users participating in the virtual world, the plurality of virtual world clients hosted by a corresponding plurality of client devices for annotations for the virtual world construct;
    receiving a response, the response including at least one annotation for a second virtual world construct of interest that is related to and separate from the first virtual world construct of interest, wherein the second virtual world construct of interest is based on the activity with which the avatar is actively engaged within the virtual world; and
    enabling the user to consume the at least one annotation for the virtual world construct provided in the response, wherein the user consumes the at least one annotation when the at least one annotation is displayed to the user on a secondary interface that includes the at least one annotation.

2. The method of claim 1 wherein the annotations including the at least one annotation provided in the response are user-defined annotations.

3. The method of claim 1 wherein each virtual world client from the plurality of virtual world clients is associated with a corresponding user from the plurality of users and stores at least one annotation created by the corresponding user for at least one virtual world construct.

4. The method of claim 3 wherein each virtual world client from the plurality of virtual world clients also stores at least one annotation obtained by the virtual world client in response to a query issued by the virtual world client for annotations for a virtual world construct identified as being of interest to the corresponding user.

5. The method of claim 1 wherein querying further comprises querying a central database for annotations for the second virtual world construct.

6. The method of claim 1 further comprising:
    determining if annotations are desired for the second virtual world construct; and
    querying the plurality of virtual world clients for annotations for the virtual world construct if a determination is made that annotations are desired for the virtual world construct.

7. The method of claim 6 wherein determining if annotations are desired for the second virtual world construct comprises:
    querying a local annotation database for annotations for the virtual world construct; and
    determining whether annotations are desired for the second virtual world construct based on an amount of annotations for the second virtual world construct stored in the local annotation database.

8. The method of claim 6 wherein determining if annotations are desired for the second virtual world construct comprises:
    querying a local annotation database for annotations for the second virtual world construct;
    determining whether any annotations for the second virtual world construct stored in the local annotation database are relevant; and
    making the determination that annotations are desired for the second virtual world construct if an amount of annotations stored in the local annotation database that are relevant is less than a threshold amount.

9. The method of claim 8 wherein determining whether any annotations for the second virtual world construct stored in the local annotation database comprises, for each annotation for the second virtual world construct stored in the local annotation database, determining if the annotation is relevant based on at least one of a group consisting of: an amount of time that has elapsed since the annotation was created, an amount of time that has elapsed since the annotation was stored in the local annotation database, whether the annotation has been consumed by the user, a rating applied to the annotation, and historical information.

10. The method of claim 1 wherein each annotation from the at least one annotation is a user-defined annotation including at least one of a group consisting of: at least one tag for the second virtual world construct, a rating for the annotation, a rating for the second virtual world construct, a user-defined comment relating to the second virtual world construct, an indicator of a type of the user-defined comment, a digital video file relating to the second virtual world construct, a reference to a digital video file relating to the second virtual world construct, a digital audio file relating to the second virtual world construct, a reference to a digital audio file relating to the second virtual world construct, a digital image relating to the second virtual world construct, a reference to a digital image relating to the second virtual world construct, and a reference web content relating to the second virtual world construct.

11. The method of claim 1 wherein enabling the user to consume the at least one annotation comprises one of a group consisting of: presenting the at least one annotation to the user, presenting a portion of the at least one annotation to the user, and notifying the user that the at least one annotation is available.

12. A system comprising:
   a) a communication interface communicatively coupling the system to a network; and
   b) a processor associated with the communication interface; and
   c) a control system associated with the communication interface and adapted to:
   i) automatically identify a first virtual world construct of interest to a user associated with an avatar within a virtual world based on an activity with which the avatar is actively engaged within a virtual world where the first virtual world construct of interest is based on pre-defined information associated with the user;
   ii) query a plurality of virtual world clients associated with a plurality of users participating in the virtual world, each virtual world client of the plurality of virtual world clients storing an annotations database comprising at least one annotation created by a corresponding user from the plurality of users for a virtual world construct;
   iii) receive a response, the response including at least one annotation for a second virtual world construct of interest that is related to and separate from the first virtual world construct of interest is based on the activity with which the avatar is actively engaged within the virtual world; and
   iv) enable the user to consume at least one annotation for the virtual world construct provided in the response, wherein the user consumes the at least one annotation when the at least one annotation is displayed to the user on a secondary interface that includes the at least one annotation.

13. A method comprising:
automatically identifying a first virtual world construct of interest to a user associated with an avatar within a virtual world based on an activity with which the avatar is actively engaged within the virtual world where the first virtual world construct of interest is based on pre-defined information associated with the user;
querying a plurality of virtual world clients associated with a plurality of users participating in the virtual world, the plurality of virtual world clients hosted by a corresponding plurality of client devices for annotations for the virtual world construct;
receiving a response, the response including the information regarding a second virtual world construct of interest that is related to and separate from the first virtual world construct of interest, wherein the second virtual world construct of interest is based on the activity with which the avatar is actively engaged within the virtual world; and
enabling the user to consume the information regarding the virtual world construct provided in the response, wherein the user consumes the at least one annotation when the at least one annotation is displayed to the user on a secondary interface that includes the at least one annotation.

* * * * *